Figure 1:
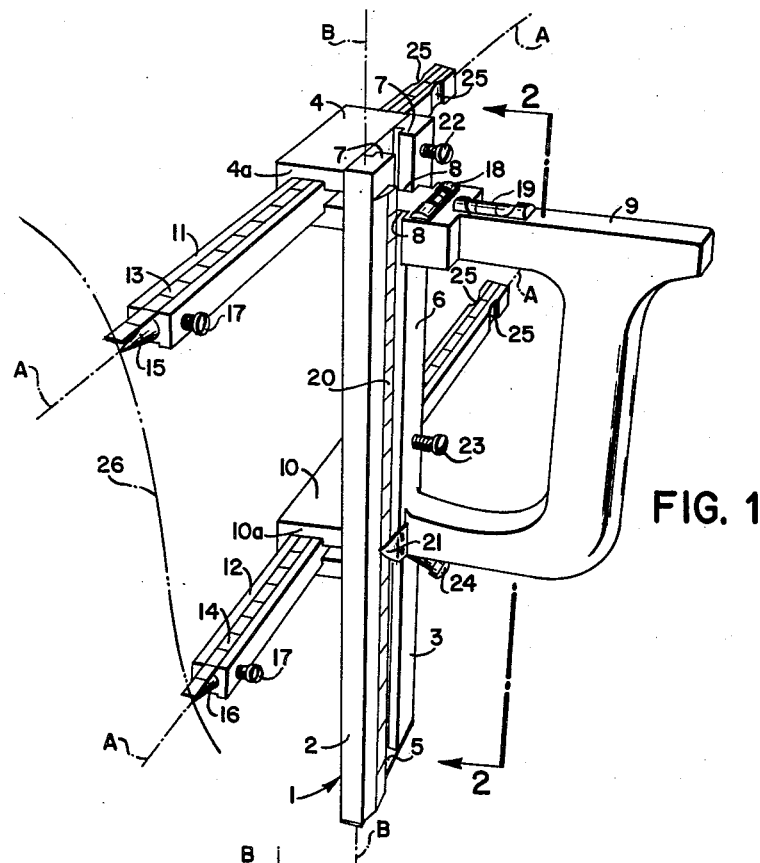

Aug. 25, 1964 J. C. ALFORD 3,145,475
MEASURING AND MARKING DEVICE
Filed Jan. 31, 1962

INVENTOR
JAMES C. ALFORD
BY
ATTORNEYS

United States Patent Office 3,145,475
Patented Aug. 25, 1964

3,145,475
MEASURING AND MARKING DEVICE
James C. Alford, 244 Old Post Road, Southport, Conn.
Filed Jan. 31, 1962, Ser. No. 170,083
4 Claims. (Cl. 33—41)

This invention relates to measuring devices and has for its object the provision of an improved device for measuring selected dimensions of forms, structures and objects and particularly for measuring the distances between selected points on surfaces of irregularly shaped and non-planar objects. This invention also relates to a device for marking the surfaces of forms, structures and like objects.

More particularly this invention provides a measuring and marking device including a frame; a spacing member slidably mounted in the frame, two measuring bars, one slidably mounted on the frame and the other slidably mounted on the spacing member; suitably arranged scales; and leveling means for positioning and maintaining the frame in vertical orientation in planes at right angles. The elements of applicant's device cooperate in a novel manner to permit accurate and facile measurement of distances and dimensions which heretofore were difficult and tedious to determine.

Prior measuring devices have been limited in their structural design and function to the measuring of either the vertical or the horizontal distances between selected points on an object. Measurement of the relationship between two points which do not both lie in a vertical or horizontal plane requires determination of both the vertical and the horizontal dimensions. Heretofore measuring instruments have been capable of measuring only one such dimension at a time. These instruments have not been capable of obtaining simultaneous readings requisite for determination of both the vertical and the horizontal distances between points on a given surface. The measuring device of the invention can be positioned and manipulated to measure simultaneously vertical and horizontal dimensions such as between two points on a curved surface. Since applicant's instrument does not require repositioning to take a second reading as do prior instruments, measurements are taken more quickly and more accurately.

The device of the invention comprises two measuring bars which cooperates with a frame to provide the dimensional readings necessary for determination of both the vertical and the horizontal distances between two selected points. A feature of the invention is the manner in which the various elements of the device cooperate with one another to permit three simultaneous readings to be taken from a single positioning of the device.

The device may also be used as a marking device by replacing one of the pointed indicator tips with a marking stylus. In using the instrument as a marking device, the measuring bar with a pointed indicator tip is placed on and moved along a selected reference line and the other bar which is equipped with the marking stylus is caused to move in fixed relation to the point or line by maintaining the frame in a vertical position. The marking stylus may be a pencil, pen or the like. If desired a cutting tool may be used to mark the object by cutting and removing surface material.

The device may include adjustable measuring members which are slidably mounted in the measuring bars to permit their adjustment so that the ends or zero points of the members may be placed adjacent the pointed tips thus providing exact measurement from the measuring bar tips to the outside surfaces of the bearing blocks in which the measuring bars are slidably mounted.

The device of the invention employs a novel arrangement of bubble levels so that the frame may be easily positioned and maintained in vertical orientation in two planes at right angles. The frame preferably consists of two longitudinal frame members with an upper bearing block and an end piece secured to the longitudinal frame members to hold them in fixed parallel position. When a frame of this construction is used, the axes of the longitudinal frame members lie in vertical planes when the device is placed in vertical orientation. Both bubble levels have center lines which are perpendicular to one another and which advantageously lie in a horizontal plane when the frame is in its vertical position. The levels are positioned adjacent each other so that they may be accurately read from a single viewing position.

One of the longitudinal frame members, preferably the one positioned nearer to the pointed tips of the measuring bars, has a scale positioned or marked on it. The scale's terminal or zero point is positioned in the same horizontal plane as the center line of the measuring bar that is slidably mounted in the upper frame bearing block. The spacing member has affixed to it an indicator aligned with the center line of the other measuring bar. This indicator shows the distance between the center lines of the two measuring bars. In addition, the spacing member has a handle attached to it to facilitate hand support and control of the device.

The pointed tips are movable and adjustable in the ends of the measuring bars and, if desired, one of the pointed tips may be substituted for an axially mounted measuring wheel. The wheel may have a scale on its circumference for indicating the distance it rolls in frictional engagement with the selected surface.

Figure 2:
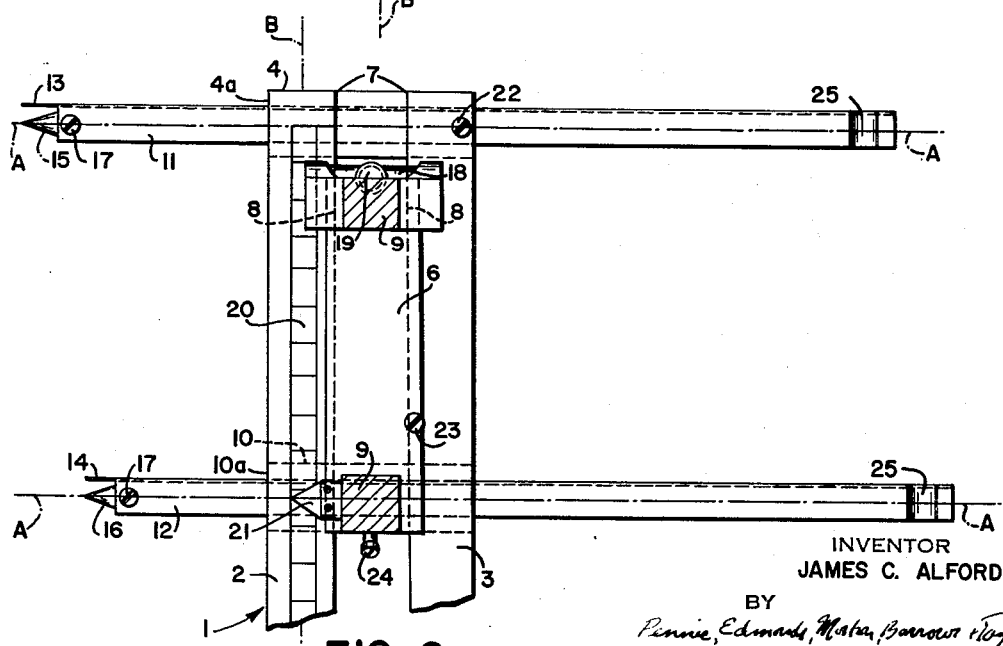

The accompanying drawings illustrate an embodiment of the invention, in which FIG. 1 is a perspective view of the device in its vertical operating position, with bars adjusted in their bearing blocks. FIG. 2 is a sectional view through line 2—2 of FIG. 1.

The device illustrated in the drawings comprises a frame 1 consisting of two longitudinal frame members 2 and 3 held in parallel arrangement by upper frame bearing block 4 and end piece 5. The frame may alternatively be constructed of a suitably designed single frame member. Longitudinal frame members 2 and 3 have tongues 7 which provide guides for the two side groves 8 on spacing member 6. Spacing member 6 is slidable on frame 1, its travel limited by end piece 5 and upper frame bearing block 4. The spacing member may be fixed in any selected position with set screw 23. Secured to one side of the spacing member 6 is handle 9. Attached to the other side of spacing member 6 is lower spacing member bearing block 10. Slidably mounted in upper frame bearing block 4 and lower spacing member bearing block 10 are upper measuring bar 11 and lower measuring bar 12. Measuring bars 11 and 12 have extensible measuring members 13 and 14 respectively. These measuring members 13 and 14 may be omitted and indices marked on bars 11 and 12. The ends of the measuring bars 11 and 12 have pointed indicator or marking tips 15 and 16 each held in adjustable position by set screws 17.

The measuring bars have axes A transverse to the longitudinal axis B of the frame.

Mounted in handle 9 are bubble levels 18 and 19, which are positioned with their axes perpendicular to one another and in a plane perpendicular to the longitudinal axis of the frame. The levels may alternatively be mounted in suitable viewing position in upper frame bearing block 4. Longitudinal frame member 2 has positioned on it a scale 20. Scale 20 has a zero point opposite the center line of measuring bar 11. An indicator 21 is positioned on the spacing member in alignment with the center line of measuring bar 12 and is positioned in relation to scale 20 to indicate the number of measuring units between measuring bars 11 and 12 at any given setting.

Set screw 23 is adjustable to hold the spacing member in its selected position and set screws 22 and 24 are adjustable to hold measuring bars 11 and 12 respectively in their selected positions. Measuring bars 11 and 12 have finger grips 25.

In the operation of the device for measuring the vertical and horizontal distance between points on a surface, for example, the curved surface of a boat as in locating the water line or measuring a plank, the longitudinal axis B of the frame is placed and maintained in vertical position by holding the device by the handle in a position such that bubble levels 18 and 19 indicate they both lie in horizontal planes. While maintaining the device in this position, measuring bars 11 and 12 are then moved in their respective bearing blocks 4 and 10 until the pointed tips 15 and 16 are in engagement with the selected points of surface 26. The measuring members 13 and 14 may be adjusted to align with tips 15 and 16 as shown in FIG. 2.

After the device is properly oriented and positioned three readings may then be taken simultaneously. The vertical distance between the center lines of measuring bars 11 and 12 is shown by the position of indicator 21 over scale 20. The distance of the tip 15 from surface 4a of upper frame bearing block 4 is read from measuring member 13. The distance of tip 16 from surface 10a of lower spacing member bearing block 10 is read from measuring member 14. Since surfaces 4a and 10a are in the same vertical plane and at right angles to the axes A, the difference between the reading of measuring member 13 and the reading of measuring member 14 indicates the horizontal distance between the selected points.

Use of the device for marking a line or point would involve generally the same steps except that since horizontal measurements need not be taken the measuring members need not be operated.

Applicant's device is particularly useful, for example, for marking a water line on the side of a curved surface of a ship's hull. The device is initially placed in vertical position with the measuring bars equipped, one with a pointed stylus and the other with a marker such as a pencil. Each tip is placed in contact with the hull. While maintaining the device in vertical orientation the indicator point is caused to move along any selected guide or reference line while the marking point is pressed against the hull. A water line is easily marked on the hull in this manner.

The device may be used as a carpenter's square by using the flat surface of frame 2 in combination with the flat surfaces of either bar 11 or bar 12.

Although the present invention has been described in conjunction with an embodiment, it is to be understood that modifications and variations may be resorted to without departing from the spirit and scope of the invention as will be readily apparent to those skilled in the art. Such modifications and variations are considered to be within the purview and scope of the invention and appended claims.

I claim:

1. A measuring device comprising a frame, having its longitudinal axis vertical when in operative position, a spacing member in slidable guided connection with the frame, an upper measuring bar in slidable connection with the frame having its axis at right angles to the longitudinal axis of the frame, a lower measuring bar in slidable connection with the spacing member having its axis parallel to the axis of and in the same plane as the axis of the upper measuring bar, said upper and lower measuring bars having adjustable pointed tips, slidable measuring members on the bars and measuring indices on the spacing member to measure the distances each bar projects from the frame and the distance between the bars, and leveling means on the device to set the frame in its operative position with its longitudinal axis vertical and two leveling bars with their axes horizontal.

2. The measuring device of claim 1 in which the leveling means are located on the device such that they may be seen from a single viewing position.

3. A measuring and marking device comprising a frame having a longitudinal axis and a transverse axis at right angles to the longitudinal axis, a spacing member in slidable guided connection with the frame which has a longitudinal axis parallel in all planes with the longitudinal axis of the frame and along which the spacing member is slidable, a lower measuring bar mounted in slidable connection with the spacing member having a slidable measuring member mounted on said bar, an upper measuring bar mounted in slidable connection with the frame having a longitudinal axis parallel to and in the same plane as both the transverse axis and the axis of the lower measuring bar, said upper measuring bar having a slidable measuring member mounted thereon, said upper and lower measuring members having measuring units thereon, measuring units on the frame for measuring the distance between the measuring bars, and two bubble levels mounted on the device near each other having their axes in parallel planes, one having its axis parallel to the axes of the measuring bars and the other having its axis at right angles to and in the same plane as the first axis, and means independent of the surface to be measured for holding the device level in both axes whereby the spacing member may be moved to the position desired, the measuring bars adjusted to engage their ends against said surface and the measuring members adjusted to measure the distances between the engagement of the bar ends and the frame.

4. The marking and measuring device of claim 3 in which one of the measuring bars has a marking tip mounted thereon and in which the means for holding the device is moved in a horizontal plane such that one measuring bar is caused to move along a pre-determined line on said surface and the measuring bar having the marking tip marks said surface.

References Cited in the file of this patent

UNITED STATES PATENTS

| | | |
|---|---|---|
| 307,321 | Osborn | Oct. 28, 1884 |
| 1,653,016 | Mellor | Dec. 20, 1927 |
| 1,696,525 | Coolidge | Dec. 25, 1928 |
| 1,863,236 | Brienza | June 14, 1932 |
| 2,178,293 | Wogeck | Oct. 31, 1939 |
| 2,540,555 | Slaughter | Feb. 6, 1951 |
| 2,542,561 | Olenjniczak | Feb. 20, 1951 |
| 2,650,435 | Kidd | Sept. 1, 1953 |
| 2,677,894 | Belgard | May 11, 1954 |

FOREIGN PATENTS

| | | |
|---|---|---|
| 204,367 | Germany | Nov. 17, 1908 |